US006033198A

United States Patent [19]

Furlani et al.

[11] Patent Number: 6,033,198

[45] Date of Patent: Mar. 7, 2000

[54] APPARATUS FOR THE FORMATION AND POLARIZATION OF MICROMAGNETS

[75] Inventors: Edward P. Furlani, Lancaster; Syamal K. Ghosh, Rochester; William J. Grande, Pittsford, all of N.Y.

[73] Assignee: Eastman Kodak Company, Rochester, N.Y.

[21] Appl. No.: 09/179,767

[22] Filed: Oct. 27, 1998

Related U.S. Application Data

[62] Division of application No. 08/795,332, Feb. 4, 1997, Pat. No. 5,893,206.

[51] Int. Cl.[7] ..................... B29C 33/32

[52] U.S. Cl. ..................... 425/3; 29/608; 425/174.8 R; 425/DIG. 33

[58] Field of Search ..................... 425/3, 174.8 R, 425/174.6, DIG. 33; 264/427–429, 272.19; 335/302; 29/607, 608, 602.1

[56] References Cited

U.S. PATENT DOCUMENTS

| | | | |
|---|---|---|---|
| 4,123,297 | 10/1978 | Jandeska et al. | 29/608 X |
| 5,336,282 | 8/1994 | Ghosh et al. . | |
| 5,446,428 | 8/1995 | Kumeji et al. | 425/3 X |
| 5,800,839 | 9/1998 | Kudo et al. | 425/3 |

*Primary Examiner*—Carl E. Hall
*Attorney, Agent, or Firm*—Mark G. Bocchetti

[57] ABSTRACT

A method for making micromagnets and magnets with a micro-polarization pattern on at least one surface thereof. The method includes the steps of molding a ceramic mold form including a cavity therein having a predetermined shape and a serpentine conduit path therethrough adjacent the cavity, the serpentine conduit path having a nominal diameter ranging down to as small as about 50 microns, sintering the mold form, supporting the mold form on a micro-porous substrate within a chamber, flooding one side of the mold form with a molten electrically conductive material, drawing a vacuum within the chamber on an opposite side of the mold form causing the molten electrically conductive material to flow into and through the serpentine conduit path toward the micro-porous substrate, cooling the molten electrically conductive material to form a serpentine electrical conductor in the mold form, forming a ferromagnetic element within the cavity, and imparting a micro-polarization pattern to the ferromagnetic element by transmitting an electrical current through the serpentine conductor.

3 Claims, 9 Drawing Sheets

APPARATUS FOR THE FORMATION AND POLARIZATION OF MICROMAGNETS

This application is a divisional application of Ser. No. 08/795,332, filed Feb. 4, 1997, now U.S. Pat. No. 5,893,206.

BACKGROUND OF THE INVENTION

1. Field of the Invention

The present invention relates generally to the production and polarization of magnets and, more particularly, to the production and polarization of micro-sized, multi-pole magnets and magnets which have a multi-pole, micro-polarization pattern imposed thereon.

2. Brief Description of the Prior Art

Generally speaking, conventional permanent magnets are greater than one cubic centimeter in volume and have two or more magnetic poles on their surface which are greater than one millimeter in width. The fabrication of these magnets involves the formation of raw magnetic materials into a desired shape. The magnetic materials so shaped are then polarized to achieve the desired pole structure on the surface of the magnet. A variety of processes are known in the prior art for forming conventional magnets including injection molding, extrusion molding, cold pressing, and hot pressing, among others. Once the magnetic material is formed in the desired shape, the material is polarized in magnetization fixtures that consist of standard gauge wires imbedded in a support member that surrounds and/or encloses the formed magnet. The wires are threaded through the support member such that they are close to the surface of the enclosed magnet. To polarize the magnet, a high current (often in excess of 10,000 amps) is transmitted through the wires over a short time duration (typically on the order of one millisecond). The current pulse so transmitted through the wires produces an electromagnetic field which cuts across the magnet in such a way so as to impart the desired pole structure to the surface of the magnet.

While conventional technology is adequate for the production of conventional magnets, such technology is inadequate for the production of micro-sized magnets which will be generally referred to herein as "micromagnets". "Micromagnets" are magnets which are less than one cubic millimeter in total volume and which require surface poles as small as about 100 microns in width, or less. Conventional technology is also inadequate for the production of magnets greater than one cubic millimeter in total volume with micro-polarization patterns imposed thereon. Although it is possible using conventional methods to form conductors with cross-sections smaller than standard wire gauges, using such conventional methods in a process for forming micromagnets would be exceedingly expensive. Such conventional methods include electron discharge machining or chemically machining a solid conductor such as copper to obtain the desired conductive structure. Even though conductors such as bonding wire as used in the assembly of integrated circuits are available in diameters down to about 1.25 mils, conventional methods would make it impractical, if not impossible, to precisely thread such conductors through micro-sized molds for the production of magnets with micro-polarization patterns.

SUMMARY OF THE INVENTION

It is, therefore, an object of the present invention to provide an apparatus for forming and polarizing micromagnets.

A further object of the present invention is to provide a method and apparatus for producing surface poles ranging down to about 100 to 200 microns in width or less on the surface of magnets.

These and numerous other features, objects and advantages of the present invention will become readily apparent upon a reading of the detailed description, claims and drawings set forth herein. These features, objects and advantages are accomplished by micromolding a ceramic block which includes a cavity therein in the shape of the micromagnets to be formed. Thus, the cavity in the micromolded ceramic block will generally have a depth of approximately one millimeter. There are a plurality of parallel bores through the micromolded ceramic block positioned about the periphery of the cavity, or a portion thereof, in the micromolded ceramic block. Depending on the thickness of the ceramic block and the ceramic material used to produce the ceramic block, these parallel bores may be laser machined with a $CO_2$ laser resulting in bores having a diameter in the range of from about 50 microns to about 100 microns. Alternatively, the parallel bores may be molded with the ceramic block. The bores are filled with a molten conductive metal such as gold, silver, an alloy of silver and copper, or an alloy of copper and tin using a vacuum to draw the molten conductive metal into the bores. Upon cooling there are, thus, a plurality of parallel conductors passing through the micromolded ceramic blocks. Adjacent conductors are electrically connected to one another in staggered fashion so as to create a single serpentine conductor in the micromolded ceramic block with two terminals.

A magnet is then formed in the cavity of the micromolded ceramic block. The magnet may be formed by compression molding a compounded ferromagnetic powder in the cavity or, alternatively, a heated ferromagnetic slurry with an organic binder can be poured into the cavity and cooled. Once the magnet is formed in the cavity, the serpentine conductor in the micromolded ceramic block is energized via connection to an external power source. A high current pulse of short duration is forced through the serpentine conductor thereby generating an electromagnetic field which results in a specific polarization pattern on the surface of the magnet.

DETAILED DESCRIPTION OF THE PREFERRED EMBODIMENTS

Figure 1:
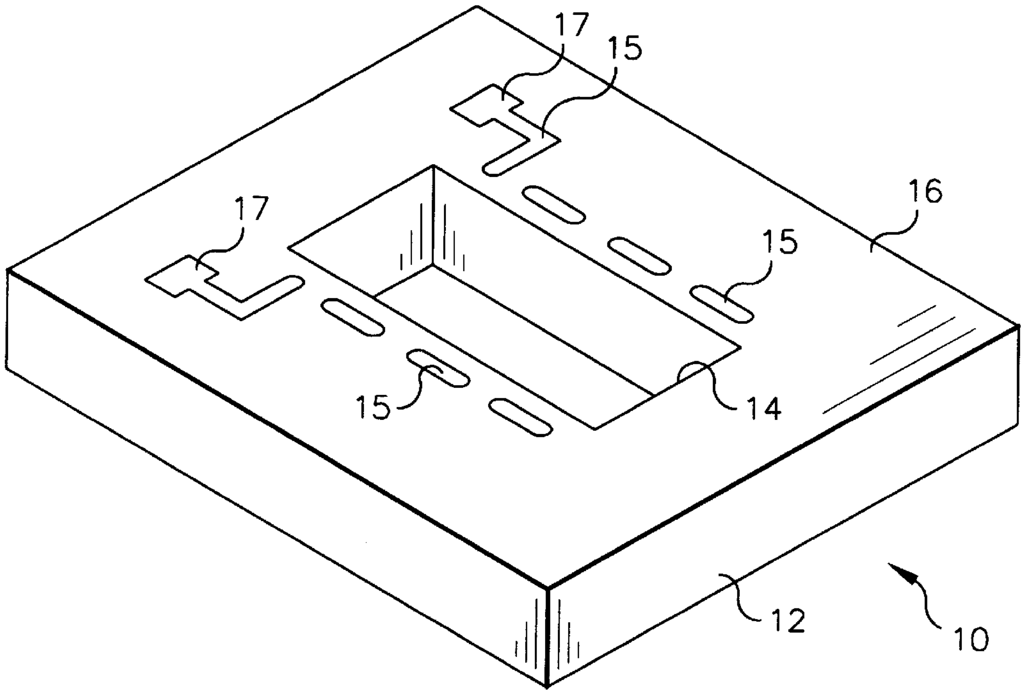
FIG. 1 is a perspective view of the magnetic polarization tool of the present invention.

Turning first to FIG. 1 there is shown a perspective view of a micromolded ceramic polarization tool 10 of the present invention for forming and polarizing ferromagnetic material. One example of ferromagnetic material which can be formed and polarized with the present invention is a hard rare-earth magnet such as NdFeB. Other hard ferromagnetic materials suitable for use with the present invention include SmCo, Ba ferrite, CoPt, etc. The micromolded, ceramic, magnetic polarization tool 10 includes a ceramic block 12 with a cavity 14 formed in a top surface 16 thereof. There is an electrical conductor 15 imbedded in ceramic block 12 which follows a serpentine path terminating at terminals 17.

Figure 2:
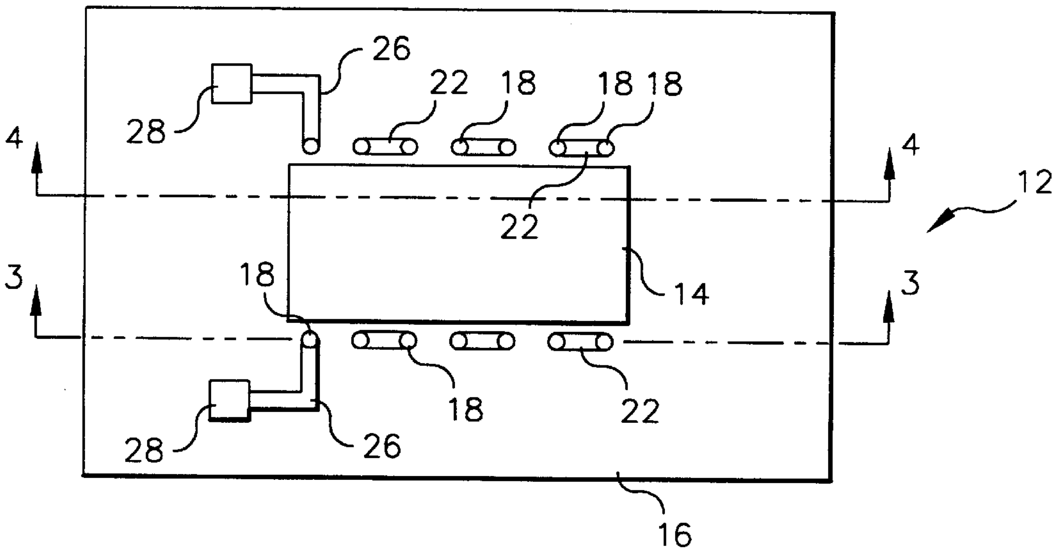
FIG. 2 is a top plan view of the micromolded ceramic block of the present invention.
Figure 3:
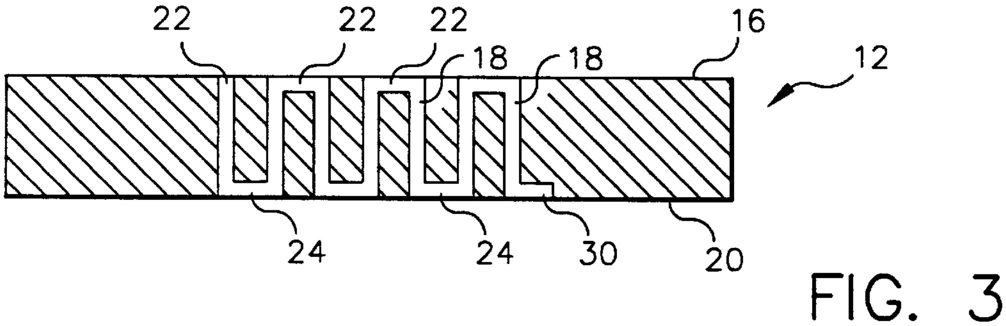
FIG. 3 is a cross-sectional view taken along line 3—3 of FIG. 2.
Figure 4:
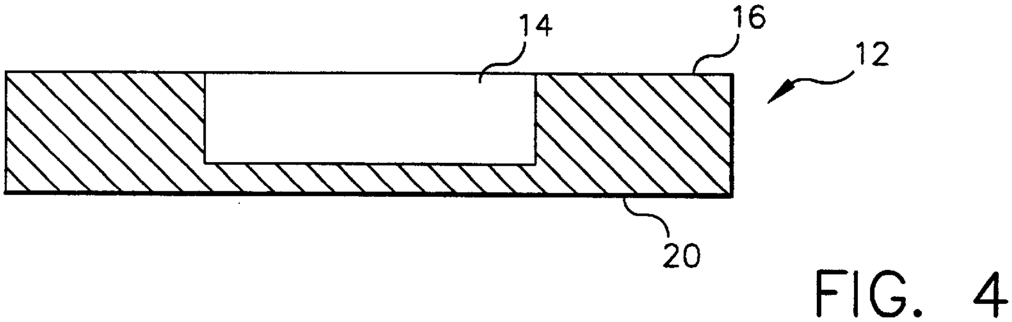
FIG. 4 is a cross-sectional view taken along line 4—4 of FIG. 2.
Figure 5:
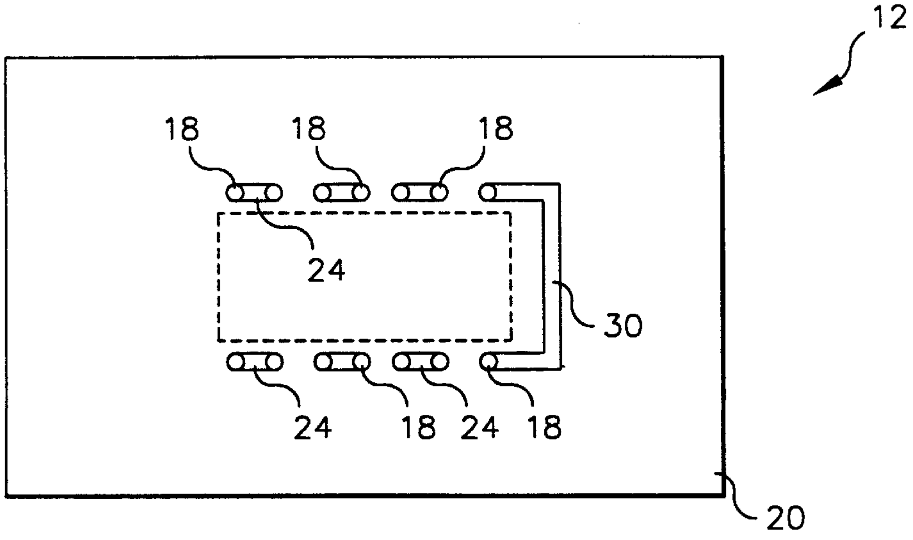
FIG. 5 is a bottom plan view of the micromolded ceramic block of the magnetic polarization tool of the present invention.

Looking next at FIGS. 2 through 5, the dimensions of micromolded ceramic block 12 are preferably in the range of from about one millimeter to about two millimeters on each side thereof depending, of course, on the magnets to be molded and polarized within cavity 14. The depth of cavity 14 is less than one millimeter and the length and width dimensions of cavity 14 are each a maximum of one millimeter but greater than 100 $\mu$m. Adjacent opposing sides of cavity 14 are a plurality of bores or orifices 18 (See FIGS. 2, 3 and 5) through which electrical conductor 15 passes. Bores or orifices 18 will generally be cylindrical in shape but need not be cylindrical as will be discussed hereinafter. Each cylindrical bore 18 passes through the full thickness of ceramic block 12 from top surface 16 to bottom surface 20. There are a plurality of grooves or channels 22 in top surface 16 connecting alternate adjacent pairs of cylindrical bores 18. Similarly, there are a plurality of grooves or channels 24 in the bottom surface 20 (See FIG. 5) connecting alternate adjacent pairs of cylindrical bores 18. As shown in FIG. 2 there is an L-shaped groove 26 in the top surface 16 which connects at one end to the left most cylindrical bore 18 on each side of cavity 14. The opposite end of each L-shaped groove 26 terminates in a rectangular recess 28 which provide residences for terminals 17. As depicted in FIG. 5 there is a U-shaped groove 30 in bottom surface 20 connecting the two right most cylindrical bores 18. In such manner, starting at one rectangular recess 28, a single channel or conduit is formed by the combination of L-shaped grooves 26, cylindrical bores 18, grooves 22, 24 and U-shaped groove 30 with such conduit on each side of cavity 14 being serpentine in configuration as can be seen most clearly in FIG. 3.

Micromolded ceramic block 12 is preferably formed of alumina. The actual process for micromolding ceramic block 12 will be discussed hereinafter. The bores 18 are preferably molded into ceramic block 12. Alternatively, once the ceramic block 12 has been molded, bores 18 can be formed therein by laser machining with a $CO_2$ laser depending on the ceramic material and the thickness of ceramic block 12. If, for example, the ceramic block 12 has been formed with $Al_2O_3$, a $CO_2$ laser can be used machine bores 18 through ceramic blocks 12 of up to about two (2) mm in thickness. The diameter of each cylindrical bore 18 will be in the range of from about 50 microns to about 1000 microns. Grooves 22, 24, 26 and 30 are also preferably also formed in the molding of block 12. Alternatively, grooves 22, 24, 26, 30 may be laser machined into the top and bottom surfaces 16, 20 of block 12 using a $CO_2$ laser again depending upon the specific ceramic material used to form block 12. The serpentine conduit thus formed in ceramic block 12 provides a path for an electrical conductor such as gold, silver, a silver-copper alloy or a copper-tin alloy. One method for inserting an electrical conductor through the serpentine path in ceramic block 12 will be described hereinafter.

The preferred method for molding ceramic block 12 is dry pressing. The ceramic selected for micromolding ceramic block 12 must be fabricated using very fine particles so that during the molding process all of the intricate features of the ceramic block are replicated with great precision. The selected ceramic particles must be less than about 0.5 $\mu$m in size. Further, in its sintered state, the selected ceramic must be electrically insulating and non-magnetic. The powder employed to mold ceramic block 12 in its precompacted, presintered form preferably comprises alumina. Other powdered ceramics usable in the practice of the present invention include magnesia, titania, zirconia, and composites thereof, as well as others. The powder is compacted into a green part by means of a die press or the like. The term "green part" as used herein means the powder in its compacted, presintered state. The powder should be compacted by applying uniform compacting forces to the powder in order to produce a green part having a uniform density. A preferred compacting device that achieves uniform compacting forces is a floating mold die press. The green part should have a predetermined density selected by the operator to produce, after sintering, a net shaped ceramic article. For alumina, the green part should have a density of from about 40% to about 60% of the sintered density with the sintered density being about 3.9 g/cc. The compaction pressure determines the density of the green part and consequently that of the sintered ceramic. If the compaction pressure is too low the ceramic can have a lower than desired density and not attain the desired net shape. If the compaction pressure is too high, the green part can laminate resulting in a ceramic that is defective for the intended use. The compaction pressure for alumina should be in the range of about 10,000 psi to about 15,000 psi, and the preferred compaction pressure for forming ceramic block 12 is about 12,000 psi.

The compaction time for alumina can be readily determined by the operator depending on the finished part size. Compaction time, for example, can be in the range of from about 10 seconds to about 60 seconds for parts ranging from about 1 $mm^3$ to about 100 $mm^3$ in size. To produce the net shape of ceramic block 12, the compaction is carried out for a time sufficient to compact the powder to form a green part having a predetermined density for the selected powder, e.g., from about 1.6 g/cc to about 2.4 g/cc for alumina as described above. It is well known that the compaction pressure and time selected by the operator can be dependent on the size of the finished part. Generally, as the part size increases, compaction time increase.

The powder is compacted in the presence of an organic watersoluble binder, such as polyvinyl alcohol, gelatin, or a polyvinyl ionomer. The binder can be added to and mixed with the powder, for example, by spray drying or ball milling, prior to placing the powder in the press.

Figure 6:
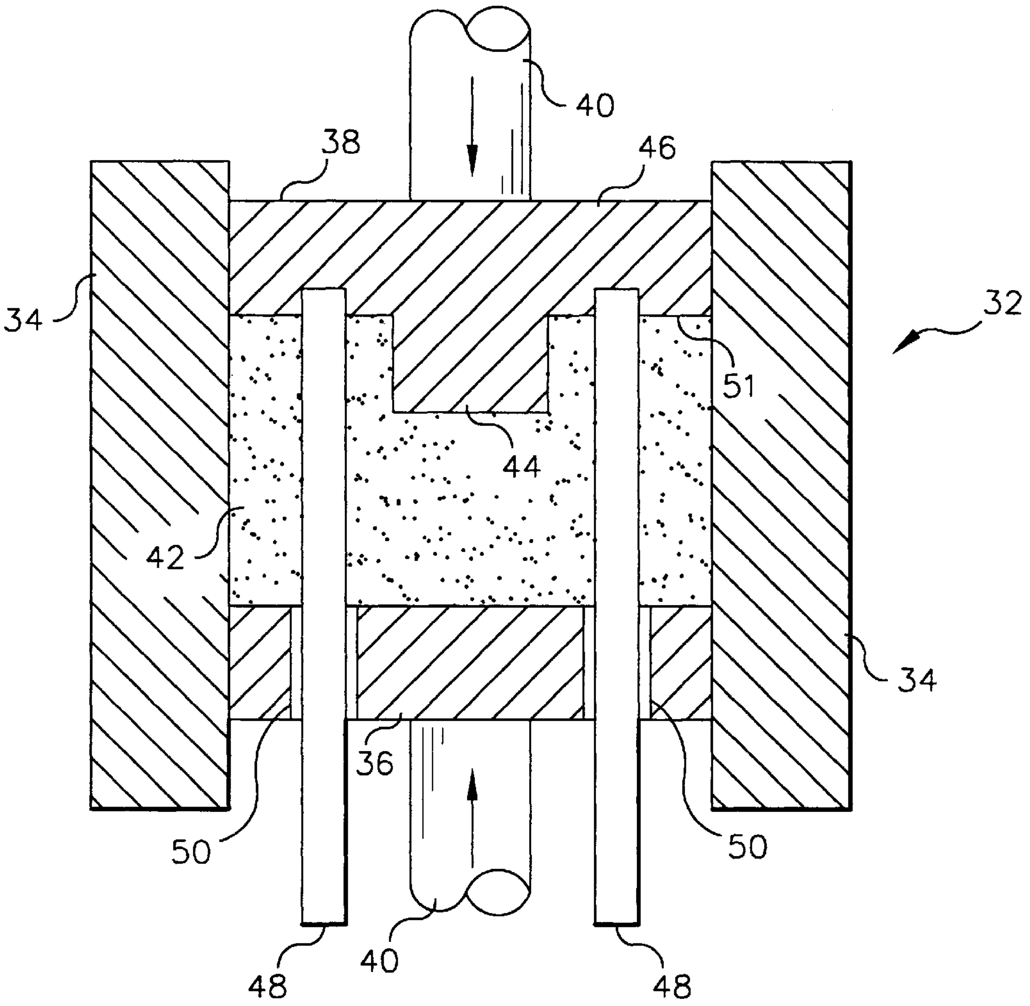
FIG. 6 is a cross-sectional schematic of the pressing apparatus used to micromold the ceramic block of FIGS. 2–5.

Turning to FIG. 6, the punch press 32 includes a metal die 34, a lower punch 36 and an upper punch 38. Lower punch 36 and upper punch 38 are mounted to rod members 40 which are used to drive lower punch 36 and upper punch 38 toward one another to compress the ceramic powder 42 contained therebetween. Upper punch 38 is preferably fabricated by using conventional wire electron discharge machining (EDM) of either hardenable stainless steel (such as AISI 440 C) or tool steel (D2 or M2). As shown in FIG. 6, upper punch 38 includes a block 44 extending from a base 46 sized and shaped to form cavity 14. Also extending from base 46 are a plurality of rods 48 which form cylindrical bores 18. The diameter of rods 48 is preferably in the range of from about 40 μm to about 200 μm but can range up to 2000 μm. There are mating orifices 50 in lower punch 36 through which rods 48 extend. Rods 48 are fabricated from hardened tool steel and are press fit into receptacles in surface 51 of base 46. The length of rods 48 will be in the range of from about 5 mm to about 20 mm for fabricating ceramic blocks 12 having a thickness in the range of from about 1 mm to about 5 mm. Block 44 and rods 48 should be made about 22% larger than the desired final dimension of cavity 14 and cylindrical bores 18 to allow for shrinkage of the green ceramic block during sintering. As depicted in FIG. 6, the mixture of ceramic powder 42 and organic binders is poured into die 34 and then pressed uniaxially at a pressure preferably about 10,000 psi and not exceeding 15,000 psi to thereby yield a green ceramic block. A single ceramic block 12, or alternatively, multiple ceramic blocks 12 can be molded simultaneously from the same mold cavity preferably using a dry pressing process or, in the alternative, a cold isostatic pressing process. Of course, it will be appreciated by those skilled in the art that, in order to simultaneously mold multiple ceramic blocks 12, it will be necessary to produce an upper punch tool 38 configured to yield a sheet of integrally formed ceramic blocks 12. The sheet of integrally formed ceramic blocks 12 can be cut at a later time into individual ceramic blocks 12. Lower punch 36 and upper punch 38 preferably also include raised features (not shown) to form grooves 24, 26, 28 and 30 in the surfaces 16, 20 of ceramic block 12.

Once a green ceramic block 12 has been molded, it must be sintered. Sintering schedules will, of course, vary depending upon the ceramic used. For alumina, the preferred sintering schedule is to heat the green ceramic block 12 from ambient temperature to 600° C. at the rate of 1.5° C. per minute and from 600° C. to 1600° C. at the rate of 5° C. per minute. The temperature should be maintained at 1600° C. for 180 minutes and then cooled from 1600° C. to 600° C. at the rate of 5° C. per minute. Finally, the temperature should be reduced from 600° C. to room temperature at the rate of 8° C. per minute.

Figure 7:
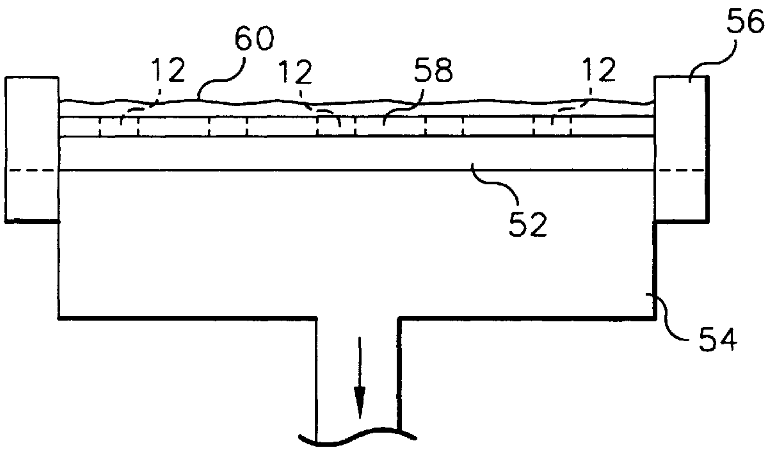
FIG. 7 is a schematic of a vacuum apparatus used to embed an electrical conductor in the conduit path molded into the ceramic block of the magnetic polarization tool.
Figure 8:
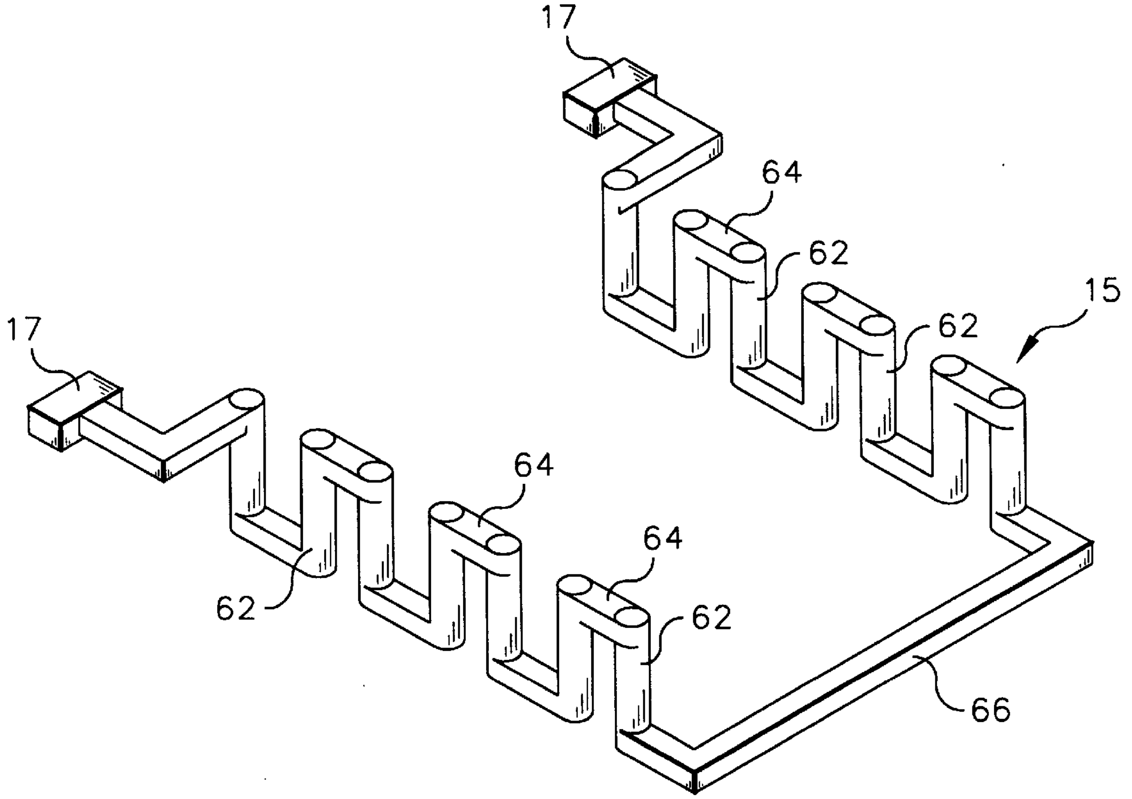
FIG. 8 is a perspective view of the serpentine electrical conductor formed in the ceramic block of the magnetic polarization tool.
Figure 9:
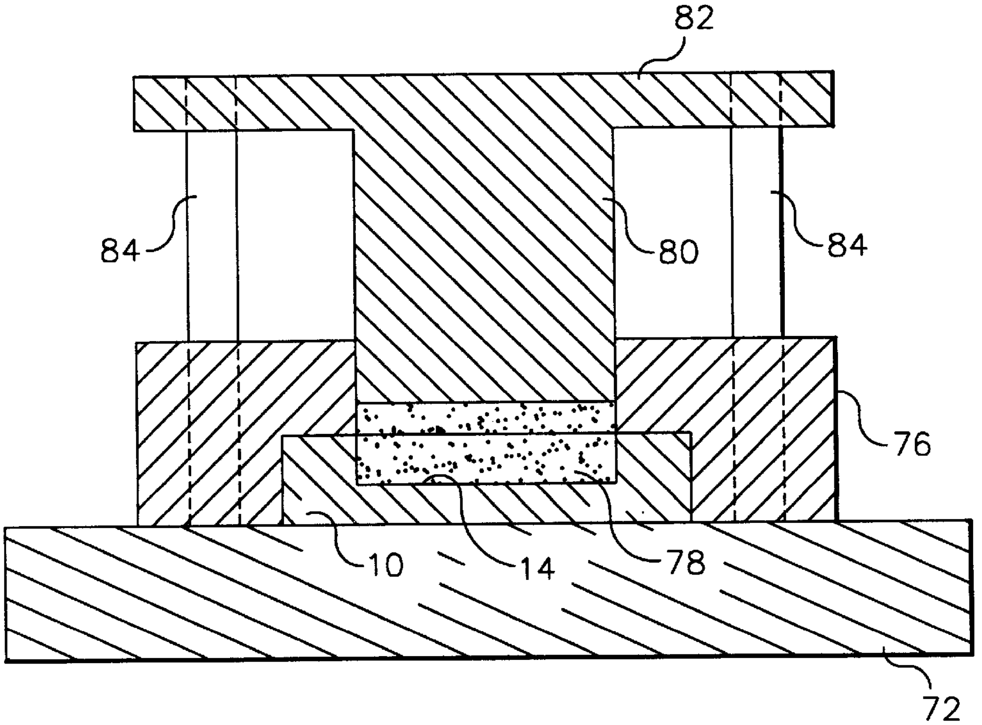
FIG. 9 is a schematic side elevational view of the polarization tool of the present invention mounted within a press for forming a ferromagnetic element in the cavity of the magnetic polarization tool.

As mentioned above, tool 10 includes a serpentine conductor 15 which resides in cylindrical bores 18 and grooves 22, 24, 26, and 30. One method for filling cylindrical bores 18 and grooves 22, 24, 26, and 30 is schematically depicted in FIG. 7. A microporous support member 52 is mounted in a vacuum chamber 54. The average pore diameter of the microporous support member 52 is preferably in the range of from about 10 μm to about 30 μm. Porosity or pore density of the microporous support member 52 will generally be in the range of from about 70% to about 90%. There is a liquid dam 56 surrounding the top portion of the vacuum chamber 54. A sintered, integral array 58 of ceramic block 12 is supported on microporous support member 52. The edges of the integral array 58 may be sealed against liquid dam 56 using a high temperature refractory (ceramic) cement. The array 58 is flooded with the molten, electrically conductive material 60 and through the application of a vacuum using vacuum chamber 54, the molten electrically conductive material is drawn into cylindrical bores 18 and grooves 22, 24, 26, and 30. At least that portion of the apparatus shown in FIG. 9 containing the microporous support member 52, liquid dam 56, and array 58 should be maintained at a temperature above the melting point of the electrically conductive material 60 while it is being drawn into the and through cylindrical bores 18 and grooves 22, 24, 26, and 30. Upon cooling the array 58 there is formed the continuous serpentine conductor 15 in each of the individual ceramic blocks 12 as depicted in FIG. 8. The serpentine conductor 15 is comprised of a plurality of substantially parallel bus bars 62 interconnected by straight connector 64 and U-shaped connector 66, as well as a pair of terminals 17.

In many instances, it should be possible to cause the molten, electrically conductive material 60 to flow into and through the cylindrical bores 18 and grooves 22, 24, 26, and 30 by gravity. Thus, the same apparatus as schematically depicted in FIG. 7 could be used with the exception chamber 54 would not have to be a vacuum chamber.

Once the formation of the serpentine conductor 15 is completed, the array 58 is separated from microporous support member 52 and removed from vacuum chamber 54. The top and bottom surfaces 16, 20 of array 58 must then be cleaned to remove excess material left over from application of molten conductor 60. Both surfaces of the array can be polished using, for example, a diamond, alumina, or silicon carbide slurry as is well known in the art in order to remove such excess material. The top and bottom sides of the array would then be polished in sequence. Once the array 58 has been polished, a diamond saw can be used to cut array 58 into individual tools 10. Looking next at FIG. 9, there is shown the tool 10 of the present invention supported on the platen 72 of a dry pressing machine (not shown). The tool 10 or, alternatively, a series of tools 10 are held in a fixed position on platen 72 by means of mold support 76. Mold support 76 also serves to hold enough ferromagnetic powder 78 to enable compression to the desired shape, and to guide the punch 80 projecting down from press plate 82. Guide pins 84 are used to align punch 80 with respect to cavity 14 of tool 10. Ferromagnetic powder such as NdFeB is compounded with polymeric binder such as nylon and pelletized into fine pellets for ease of handling and pressing within the ceramic tool 10. The lower platen 72 is heated above the glass transition temperature of the thermoplastic polymer resin used as a bonding agent in the ferromagnetic powder. The press is then actuated such that punch block 80 inserts down into cavity 14 of tool 10 thereby compressing the ferromagnetic powder 78 within cavity 14 to form a ferromagnetic element 79 (See FIG. 10). The sides of cavity 14 are all preferably at an angle of slightly greater than 90° from the bottom surface of cavity 14 in order to promote release of the ferromagnetic element therefrom. In addition, a variety of release agents known to those skilled in the art may also be used to promote such release. Once the ferromagnetic clement 79 is so formed, the ceramic molding tool 10 is removed from the dry press (not shown). Terminals 17 of tool 10 are then connected to a DC power supply 86. A high current is thereby delivered to the serpentine conductor embedded within tool 10 for a short period of time, preferably about one (1) msec. The magnitude of the current is limited by the maximum operating temperature of the conductors. Looking at currents in a continuous operating mode, current densities on the order of $10^5$ amps/$cm^2$ can be obtained in practice which translates into a current of approximately 7 amps for a 100 μm diameter conductor. Of course, pulse currents are used for magnetic polarization which can therefore be orders of magnitude higher. The current pulse produces an electromagnetic field emanating from each bus bar 62 thereby polarizing the surface of the ferromagnetic element within cavity 14 in such a way so as to render the desired micro-polarization pattern on the surface of ferromagnetic element 79. In such manner, a micromagnet 90 is produced (see FIG. 11) which can be less than one cubic millimeter in total volume. Assuming adjacent 100 μm diameter bus bars 62 are spaced apart by a distance of 100 μm, micromagnet 90 is produced with a plurality of north pole regions 92 and south pole regions 94 in alternating fashion having a width on the order of about 200 microns each.

It will be appreciated by those skilled in the art that through a different arrangement of the bus bars 62 a magnet can be produced which has a micro-polarization pattern of individual north or south poles separated by non-polarized regions. Thus, looking at FIG. 11, regions 92 may be north or south poles while regions 94 would be non-polarized. This would be accomplished by staggering every other bus bar 62 a sufficient distance from cavity 14 such that the electromagnetic field emanating from every other bus bar 62 does not result in polarization of the magnet 90. The term "micro-polarization pattern" as used herein is intended to mean alternating north and south poles each having a width which is in the range of from about 100 microns or less to about 2000 microns, or alternating polarized and non-polarized regions each having a width which is in the range of from about 100 microns or less to about 2000 microns, and it should be understood the "pattern" need not be symmetrical.

Figure 12:
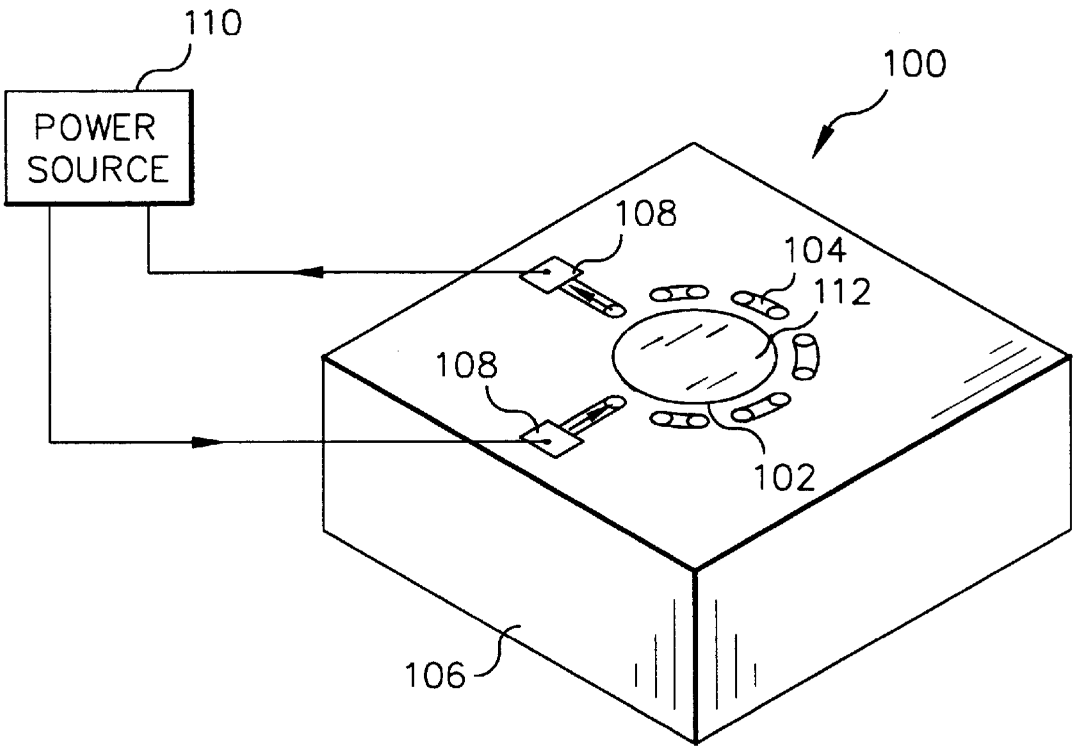
FIG. 12 is a perspective view of an alternative magnetic polarization tool connected to a power source wherein the cavity is cylindrical.
Figure 13:
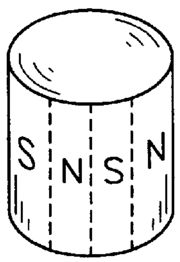
FIG. 13 is a perspective view of a magnetic element formed with the magnetic polarization tool depicted in FIG. 12 and showing an exemplary pole structure on the surface thereof.

Looking next at FIG. 12, there is shown an alternative tool 100 of the present invention having a cylindrical cavity 102 therein. A serpentine conductor 104 is embedded within a ceramic block 106 in the same method as described above with reference to tool 10. Tool 100 includes terminals 108 which are connected to a power supply 110 in order to polarize the surface of the cylindrical ferromagnetic element 112 residing within cavity 102. The result is a cylindrical magnet as depicted in FIG. 13 with an alternating north and south pole pattern. Assuming the bus bars of serpentine conductor 104 are about 40 to 50 microns in diameter and are spaced on centers at a distance of about 100 microns, each pole region will have a width on the order of about 100 microns.

Figure 14:
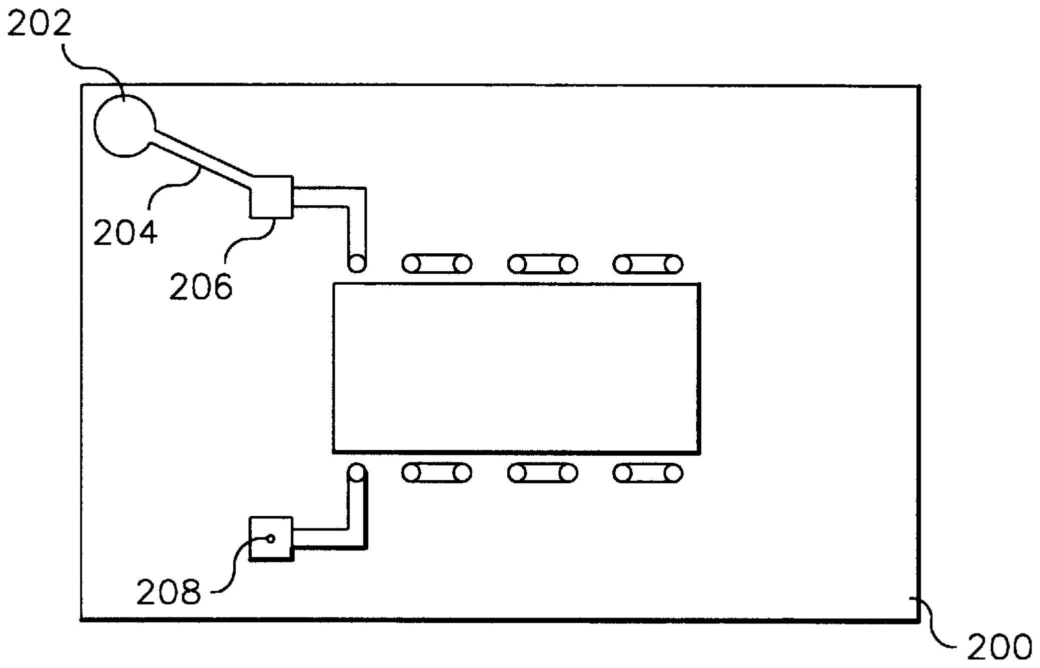
FIG. 14 is a top plan view of an alternative embodiment of the micromolded ceramic block depicted in FIG. 2.

Looking next at FIG. 14, there is shown an alternative embodiment ceramic block 200 for use in the practice of the present invention. Ceramic block 200 is virtually identical to ceramic block 12 depicted in FIGS. 2, 3 and 4 with the exceptions that ceramic block 200 also includes a cylindrical depression 202, a trough 204 connecting cylindrical depression 202 to rectangular recess 206, and a vent hole 208 through the thickness of ceramic block 200. Ceramic block 200 is produced by the same methods described herein with reference to ceramic block 12. Thus, individual ceramic blocks 200 may be molded or, multiple ceramic blocks 200 can be molded into one integrally formed sheet or array.

Figure 15:
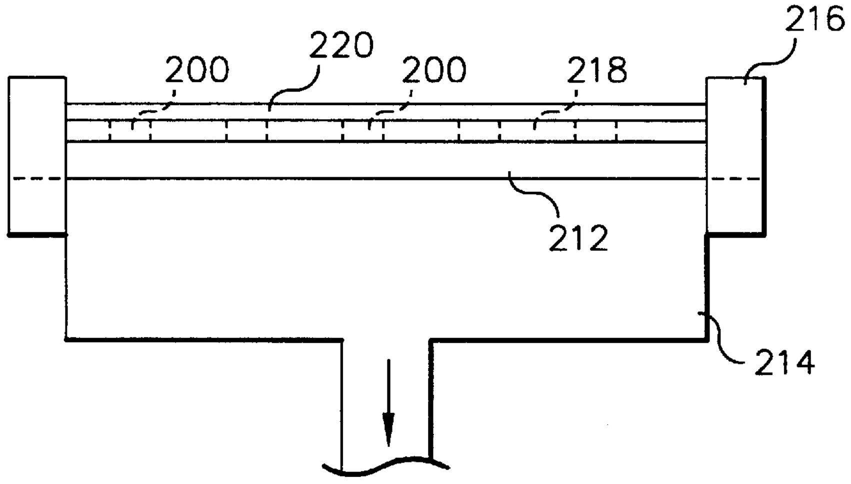
FIG. 15 is a side elevational schematic of an alternative embodiment of the vacuum apparatus depicted in FIG. 7.

An alternative method for filling the serpentine path of ceramic block 200 is schematically depicted in FIG. 15. A microporous support member 212 is mounted in a vacuum chamber 214. The average pore diameter of the microporous support member 212 is preferably in the range of from about 10 μm to about 30 μm. Porosity or pore density of the microporous support member 212 will generally be in the range of from about 70% to about 90%. There is a liquid dam 216 surrounding the top portion of the vacuum chamber 214. A sintered, integral array 218 of ceramic blocks 200 is supported on microporous support member 212. A non-porous ceramic plate 220 is placed on top of integral array 218. Non-porous ceramic plate 220 includes a plurality of openings 222 (see FIG. 16) therethrough. Each opening 222 aligns with a cylindrical recess 202 in a ceramic block 200 of array 218. The edges of the ceramic plate 220 may be sealed against liquid dam 56 using a high temperature refractory (ceramic) cement.

Figure 16:
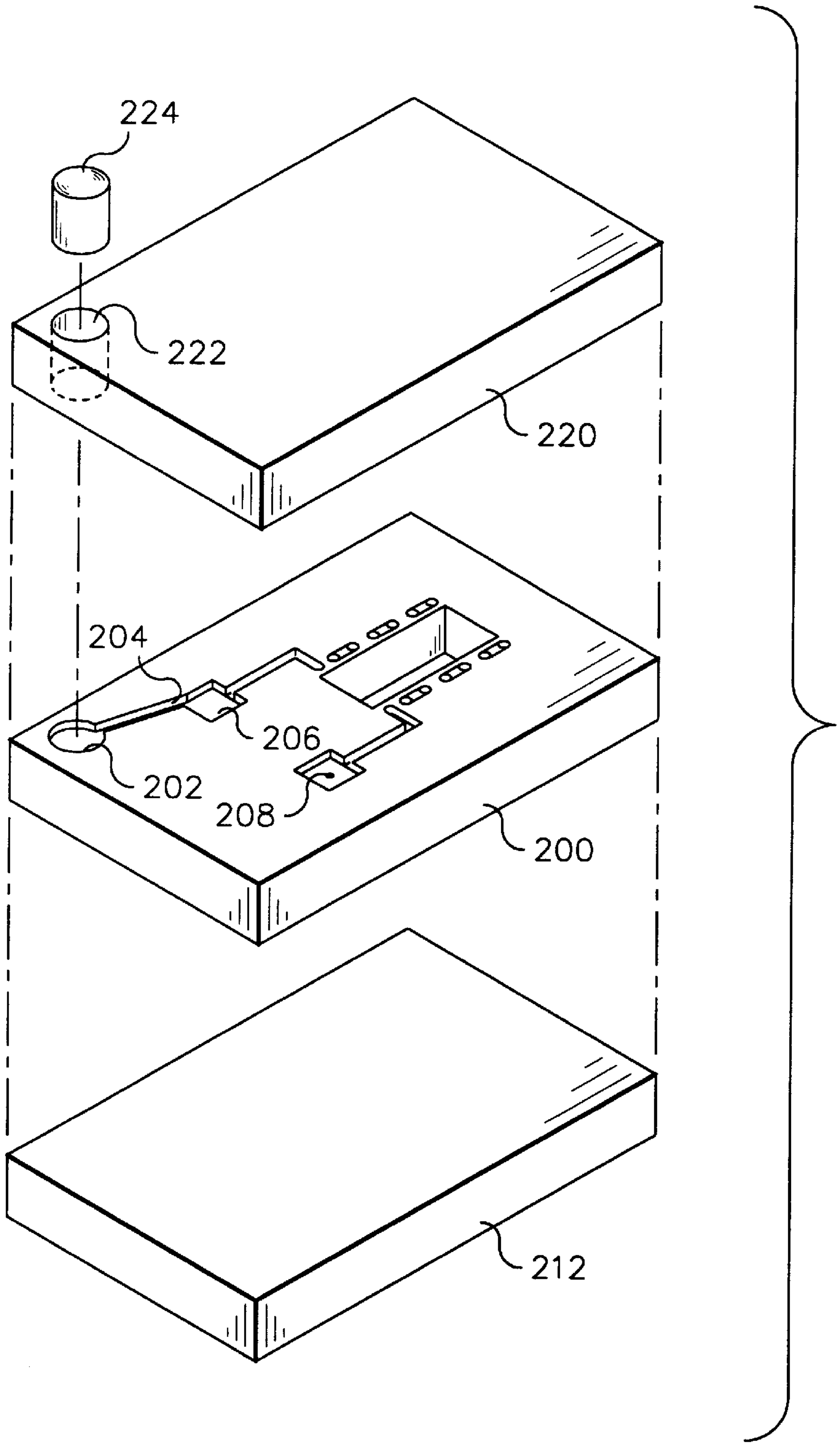
FIG. 16 is an exploded view of the microporous support member, the array and the non-porous plate of FIG. 15.

FIG. 16 shows an exploded perspective view of microporous support member 212, array 218, and non-porous ceramic plate 220. For purposes of simplicity, array 218 is depicted as a single ceramic block 200. In practicing this alternative method for filling the serpentine path of ceramic block 200, individual slugs 224 of electrically conductive material are inserted into each opening 222. Each slug 224 has a predetermined volume which is slightly greater than the total volume of the serpentine path, but less than the total volume of the serpentine path, cylindrical depression 202 and the trough 204. The apparatus is then heated (by means not shown) to a temperature above the melting point of the electrically conductive material thereby melting slugs 224. Through the application of a vacuum using vacuum chamber 214, the molten, electrically conductive material is drawn into the serpentine path of ceramic block 212. Vent hole 208 ensures that no air will be trapped in the serpentine path as the vacuum is drawing the molten, electrically conductive material therethrough. Upon cooling the array 218 there is formed the continuous serpentine conductor in each of the individual ceramic blocks 200. With this alternative method for filling the serpentine paths of ceramic blocks 200, once ceramic plate 220 and array 218 are removed from vacuum chamber 214, and ceramic plate 220 is separated from array 218, there should be very little excess conductor material to clean from the top surface of array 218.

Figure 10:
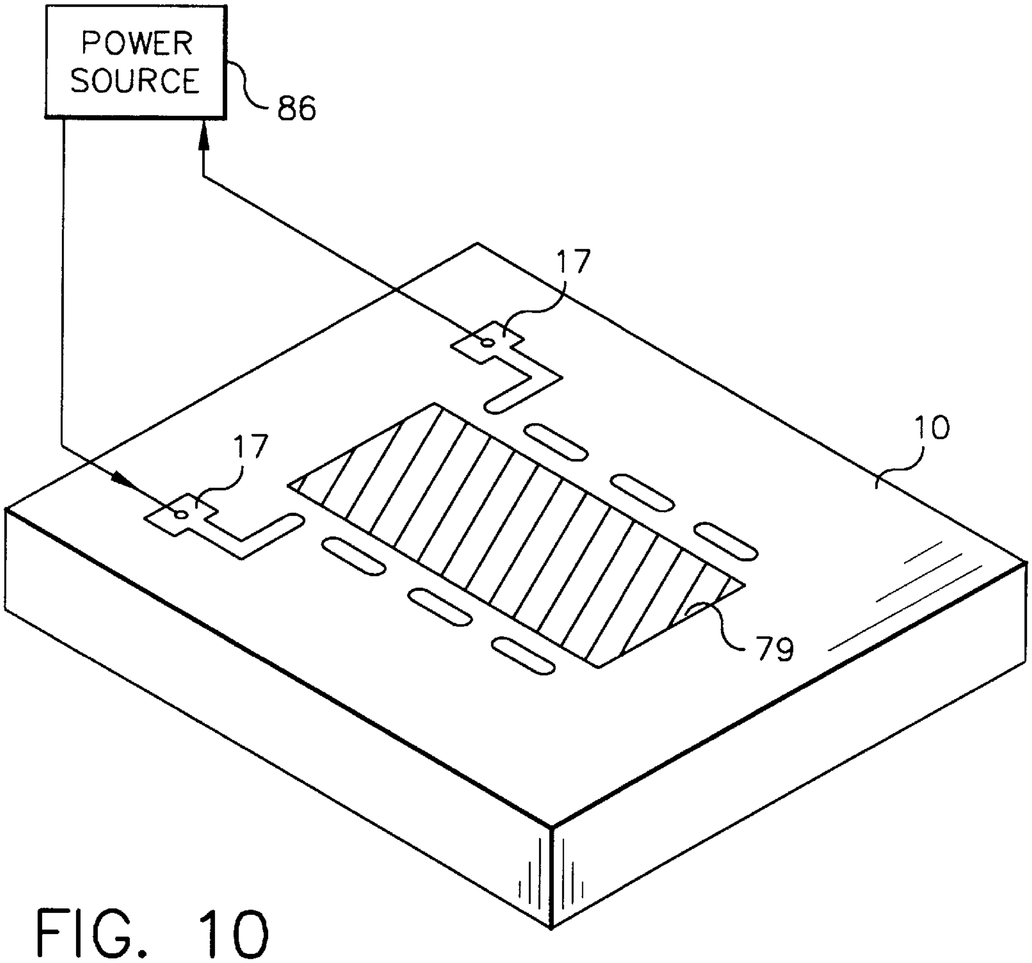
FIG. 10 is a perspective view of the magnetic polarization tool connected to a power source to polarize the ferromagnetic element formed within the polarization tool.
Figure 11:
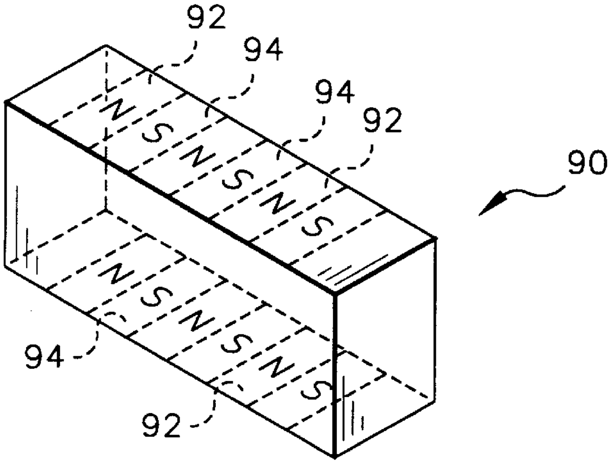
FIG. 11 is a perspective view of an exemplary magnetic element made with the magnetic polarization tool of the present invention depicting an exemplary pole structure on the surface thereof.
Figure 17:
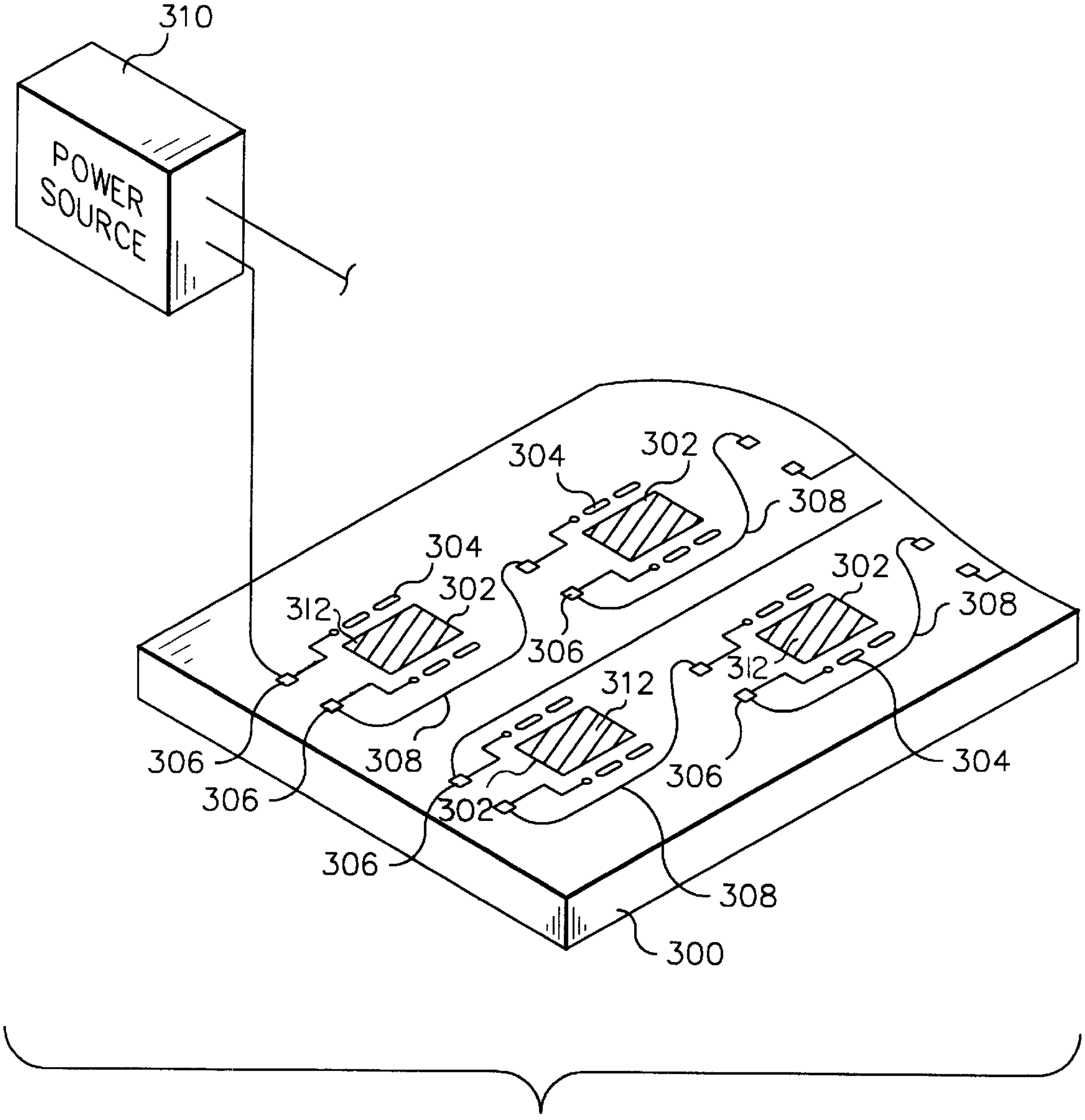
FIG. 17 is a perspective view of an array of tools containing ferromagnetic elements with the serpentine conductors of each tool connecting in series and connected to a single power source.

Although FIGS. 10 and 12 depict tools 10, 100 being used individually, each with a respective power source, tools 10, 100 can be left uncut in an array 300 as shown in FIG. 17. The array 300 would include a plurality of cavities 302, each with a respective serpentine conductor 304 with each serpentine conductor terminating at terminals 306. Conductors 308 can be used to connect all, or selected ones of the serpentine conductors in series such that a single power source 310 can be used to simultaneously impart a micropolarization pattern to each ferromagnetic element 312.

It should be appreciated by those skilled in the art that tools 10 and 100 of the present invention can be used both for the formation through dry pressing or other means of a ferromagnetic element and for the polarization thereof. Alternatively, tools 10, 100 of the present invention can be used merely to polarize already formed ferromagnetic elements. Thus, with reference to tool 10, a ferromagnetic element may be cat to the desired shape and inserted into cavity 14. Similarly, a cylindrical ferromagnetic element may be produced by a other methods and cut to the desired length for insertion into cavity 102 for polarization. For example, a cylindrical ferromagnetic rod may be produced by extrusion and then cut into desired sectional lengths.

It will be appreciated that a variation of the device depicted in FIG. 1 which differs only in the dimensions thereof can be used to produce both micromagnets and magnets with a micro-polarization pattern. The depth of cavity 14 would still be about 1 mm and the width of cavity 14 would still be about 1 mm. The length of cavity 14 could be increased to, for example, 10 mm. In such manner, a magnet having a length of 10 mm could be produced which has a micropolarization pattern imparted thereto. If desired, the resulting magnet could then be cut into multiple (e.g. ten) individual micromagnets.

Those skilled in the art will understand that ceramic blocks 12, 200 can be micromolded without the plurality of grooves or channels 22 in top surface 16 connecting alternate adjacent pairs of cylindrical bores 18 and the plurality of grooves or channels 24 in the bottom surface 20 connecting alternate adjacent pairs of cylindrical bores 18. Although impractical, once bus bars 62 have been formed in cylindrical bores 18, connections can be made by soldering.

Although the serpentine conductors 15, 104, 304 are discussed herein as generally surrounding or encircling cavities 14, 102, 302, respectively, it should be recognized that there may be instances where it is desirable to micropolarize only a portion of the surface of a ferromagnetic element. In such cases, the serpentine conductor will be positioned only about a predetermined portion of the periphery of the cavity defining the area of the ferromagnetic element that is to have a micropolarization pattern imparted thereto. On the other hand, multiple serpentine conductors can be used about the periphery of a single cavity with separate power source connected to each serpentine conductor. In such manner, a magnet can be produced which includes a plurality of micropolarization patterns, each with different magnetic field characteristics.

Although the bus bar portions of the serpentine conductors have been discussed herein in terms of diameter, it is not intended to limit such bus bar to having a generally cylindrical shape. Bus bars may be formed with a variety of different cross-sectional shapes such as, for example, have circular, elliptical, rectangular, triangular, trapezoidal, etc. In fact, using bus bars with such different cross-sectional shapes will allow for varying the shape of the electromagnetic field generated therewith which can be beneficial for producing a particular micropolarization pattern. Thus, as used herein, "diameter" is intended to include cross-sectional shapes other than circular and is more loosely defined as the average cross-sectional dimension.

In addition to having bus bars of different cross-sectional shape, another way to vary electromagnetic field characteristics is to not connect all of the bus bars in series. Instead, some of the bus can be connected in parallel. For example, looking at a cavity with seven bus bars (first through seventh) on one side thereof, the second and third bus bars may be connected in parallel with one another as may be the fifth and sixth. These pairs of bus bars may then be connected in series with the first, fourth and seventh bus bars. Using such an arrangement will create an alternating micropolarization pattern where not only the widths vary but also the field strength.

From the foregoing, it will be seen that this invention is one well adapted to attain all of the ends and objects hereinabove set forth together with other advantages which are apparent and which are inherent to the invention.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

What is claimed is:

1. An apparatus for making a magnet with a micropolarization pattern comprising:

(a) an electrically non-conductive base element having a cavity therein adapted to receive a ferromagnetic element; and (b) an electrical conductor substantially embedded in said electrically non-conductive base element, said electrical conductor including a plurality of generally parallel, spaced-apart bus bars and a plurality of connector bars connecting said plurality of generally parallel, spaced-apart bus bars, said plurality of generally parallel, spaced-apart bus bars and said plurality of connector bars following a generally serpentine path about said cavity, said electrical conductors further including a pair of end terminals adapted to be connected to a power source, said spaced-apart bus bars having a diameter of from about 50 $\mu$m to about 2000 $\mu$m.

2. An apparatus as recited in claim 1 wherein:

said cavity has a depth not greater than about 100 $\mu$m.

3. An apparatus as recited in claim 1 wherein:

said spaced-apart bus bars have a diameter of from about 50 $\mu$m to about 200 $\mu$m.

* * * * *